(12) United States Patent
Shimura et al.

(10) Patent No.: US 11,090,614 B2
(45) Date of Patent: Aug. 17, 2021

(54) COMPOSITE SEMIPERMEABLE MEMBRANE AND COMPOSITE SEMIPERMEABLE MEMBRANE ELEMENT

(71) Applicant: TORAY INDUSTRIES, INC., Tokyo (JP)

(72) Inventors: Harutoki Shimura, Shiga (JP); Takahiro Tokuyama, Shiga (JP); Yoshiki Nishiguchi, Shiga (JP); Yohei Adachi, Shiga (JP); Kohei Kuraoka, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/976,210

(22) PCT Filed: Feb. 28, 2019

(86) PCT No.: PCT/JP2019/007966
§ 371 (c)(1),
(2) Date: Aug. 27, 2020

(87) PCT Pub. No.: WO2019/168138
PCT Pub. Date: Sep. 6, 2019

(65) Prior Publication Data
US 2021/0001281 A1 Jan. 7, 2021

(30) Foreign Application Priority Data

Feb. 28, 2018 (JP) .............................. JP2018-034860
Feb. 28, 2018 (JP) .............................. JP2018-034861

(51) Int. Cl.
*B01D 69/12* (2006.01)
*B01D 65/08* (2006.01)
(Continued)

(52) U.S. Cl.
CPC ............. *B01D 69/12* (2013.01); *B01D 65/08* (2013.01); *B01D 67/0088* (2013.01);
(Continued)

(58) Field of Classification Search
CPC .... B01D 69/125; B01D 71/56; B01D 61/025; B01D 67/0093; B01D 2323/12;
(Continued)

(56) References Cited

U.S. PATENT DOCUMENTS 4,839,203 A * 6/1989 Davis ................. B01D 67/0088
210/500.27
6,132,804 A 10/2000 Rice et al.
(Continued)

FOREIGN PATENT DOCUMENTS

CN 1304329 A 7/2001
CN 101035607 A 9/2007
(Continued)

OTHER PUBLICATIONS

International Search Report, issued in PCT/JP2019/007966, dated May 21, 2019.
(Continued)

*Primary Examiner* — Ana M Fortuna
(74) *Attorney, Agent, or Firm* — Birch, Stewart, Kolasch & Birch, LLP

(57) ABSTRACT

A novel membrane is provided in which the permeate flow rate is not prone to decrease even when the membrane is used to process seawater with high salt concentration and high heavy metal ion concentration. This composite semipermeable membrane comprises a porous support layer, a separation function layer arranged on the porous support layer, and a coating layer coating the separation function layer, wherein the separation function layer contains a crosslinked polymer amide which is a condensate of (Continued)

polyfunctional aromatic amine and polyfunctional aromatic acid chloride, and the coating layer contains an aliphatic polymer including a polyether moiety and a carbonic acid polymer moiety.

9 Claims, 1 Drawing Sheet

(51) Int. Cl.
- *B01D 67/00* (2006.01)
- *B01D 69/10* (2006.01)
- *B01D 71/56* (2006.01)
- *C08G 69/12* (2006.01)
- *C09D 133/02* (2006.01)
- *C09D 171/02* (2006.01)

(52) U.S. Cl.
CPC ............ *B01D 69/10* (2013.01); *B01D 71/56* (2013.01); *C08G 69/12* (2013.01); *C09D 133/02* (2013.01); *C09D 171/02* (2013.01)

(58) Field of Classification Search
CPC ..... B01D 2325/06; B01D 69/02; C02F 1/441; C08F 293/00
See application file for complete search history.

(56) References Cited

U.S. PATENT DOCUMENTS

| | | | |
|---|---|---|---|
| 6,177,011 | B1 | 1/2001 | Hachisuka et al. |
| 6,280,853 | B1 | 8/2001 | Mickols |
| 6,913,694 | B2* | 7/2005 | Koo .................. B01D 67/0088 210/490 |
| 2009/0050558 | A1 | 2/2009 | Ishizuka et al. |
| 2010/0143733 | A1 | 6/2010 | Mickols et al. |
| 2012/0048799 | A1* | 3/2012 | Na ........................ B01D 71/44 210/490 |
| 2014/0251892 | A1 | 9/2014 | Lee et al. |
| 2014/0339152 | A1 | 11/2014 | Okabe et al. |
| 2015/0218017 | A1* | 8/2015 | McGinnis ............ B01D 61/002 210/654 |
| 2016/0008764 | A1* | 1/2016 | Yoneyama ............. B01D 63/10 427/8 |
| 2016/0243503 | A1 | 8/2016 | Okabe et al. |
| 2016/0339396 | A1 | 11/2016 | Inoue et al. |
| 2020/0188861 | A1 | 6/2020 | Hamada et al. |

FOREIGN PATENT DOCUMENTS

| | | |
|---|---|---|
| CN | 102232005 A | 11/2011 |
| CN | 104245100 A | 12/2014 |
| CN | 105611994 A | 5/2016 |
| CN | 105939778 A | 9/2016 |
| JP | 2001-79372 A | 3/2001 |
| JP | 2001-327840 A | 11/2001 |
| JP | 2003-501249 A | 1/2003 |
| JP | 2012-510893 A | 5/2012 |
| KR | 10-2014-0119016 A | 10/2014 |
| WO | WO 97/34686 A1 | 9/1997 |
| WO | WO 2014-133133 A1 | 9/2014 |
| WO | WO 2015/046582 A1 | 4/2015 |
| WO | 2015-516876 A | 6/2015 |
| WO | WO 2018/003943 A1 | 1/2018 |

OTHER PUBLICATIONS

Written Opinion of the International Searching Authority, issued in PCT/JP2019/007966, dated May 21, 2019.

Korean Office Action issued in Patent Application No. 10-2020-7024718 dated Mar. 17, 2021.

Chinese Office Action and Search Report for Chinese Application No. 201980015916.5, dated Dec. 17, 2020, with English translation.

Korean Office Action dated Dec. 4, 2020 for Apbilcation No. 10-2020-7024718 with an English translation.

* cited by examiner

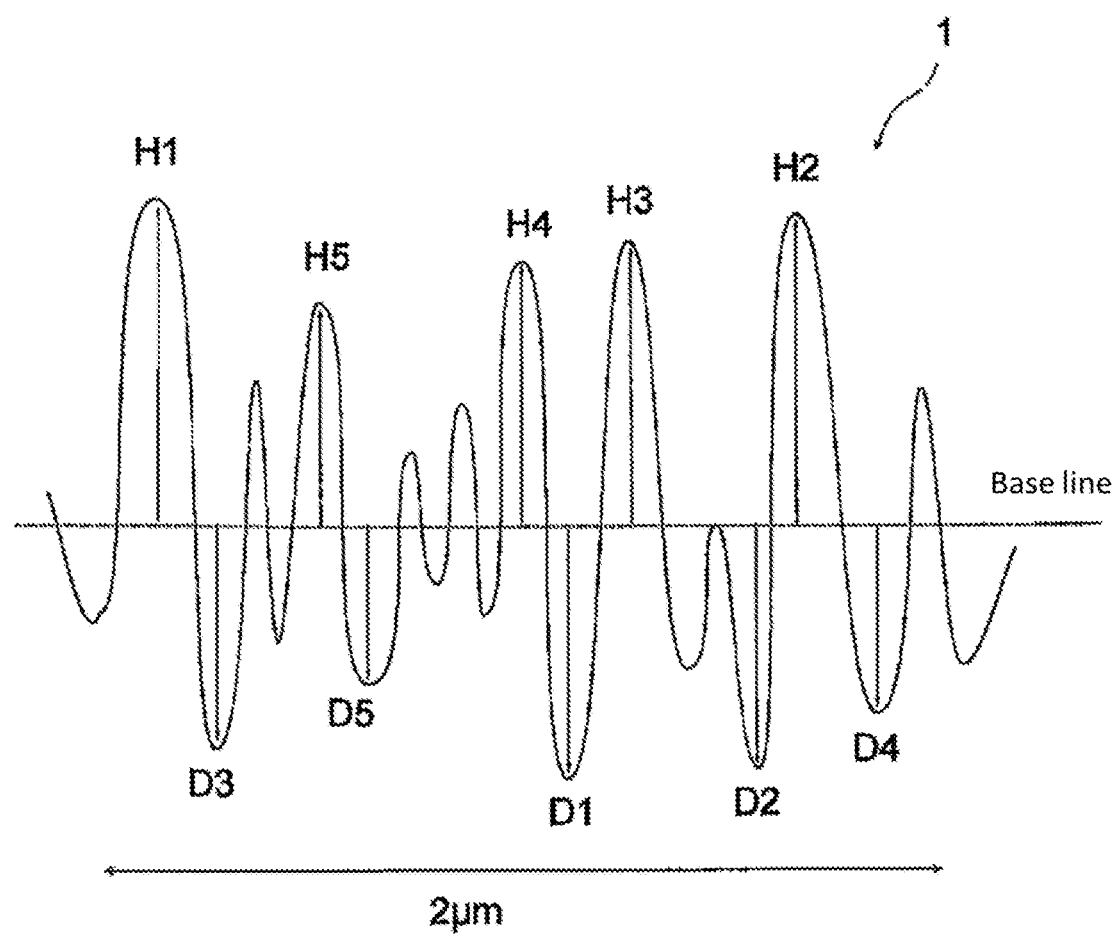

COMPOSITE SEMIPERMEABLE MEMBRANE AND COMPOSITE SEMIPERMEABLE MEMBRANE ELEMENT

TECHNICAL FIELD

The present invention relates to a semipermeable membrane useful for selective separation of liquid mixtures, and to a composite semipermeable membrane excellent in water permeability and fouling resistance.

BACKGROUND ART

Examples of membranes used for membrane separation of liquid mixtures include microfiltration membranes, ultrafiltration membranes, nanofiltration membranes, reverse osmosis membranes, and the like, and these membranes are used for, for example, obtaining drinking water from water containing salts or harmful substances, production of industrial ultrapure water, wastewater treatment, collection of valuables, and the like.

Most of currently commercially available reverse osmosis membranes and nanofiltration membranes are composite semipermeable membranes, and among them, a composite semipermeable membrane (Patent Literature 1), which is obtained by coating a microporous support membrane with a separation functional layer formed of a crosslinked polyamide obtained by a polycondensation reaction of polyfunctional amines with polyfunctional acid halides, has been widely used as a separation membrane having high permeability and a high selective separation property.

However, when a composite semipermeable membrane is continuously used, dirt substances, such as organic substances, heavy metals, and microorganisms, adhere to a surface of the membrane, and a permeation flux of the membrane tends to decrease. In order to remove the dirt substances, chemical cleaning by an acid or an alkali is required after a certain period of operation. However, as a result, the performances of the membrane may deteriorate. Therefore, in order to continue stable filtration operation for a long time, there is a demand for a composite semipermeable membrane to which dirt substances hardly adhere and which has little changes in performances before and after being cleaned with chemicals such as an acid and an alkali.

As a method for improving adhesion of dirt, Patent Literature 2 has proposed a method for preventing fouling by neutralizing charged states by means of coating a surface of a separation functional layer with a polyvinyl alcohol, and Patent Literatures 3 and 4 have proposed a method for, for example, forming a coating layer containing a polyalkylene oxide.

CITATION LIST

Patent Literature

Patent Literature 1: JP-A-2001-79372
Patent Literature 2: WO 97/34686
Patent Literature 3: JP-A-2003-501249
Patent Literature 4: JP-A-2015-516876

SUMMARY OF INVENTION

Technical Problem

A novel membrane is required in which the permeate flow rate is not prone to decrease even when the membrane is used for the treatment of seawater with a high salt concentration and a high heavy metal ion concentration.

Solution to Problem

In order to solve the above problems, the present invention has a configuration of any one of the following items [1] to [10].

[1] A composite semipermeable membrane including:
a microporous support layer;
a separation functional layer arranged on the microporous support layer; and
a coating layer configured to coat the separation functional layer,
in which the separation functional layer contains a crosslinked polyamide which is a condensate of a polyfunctional aromatic amine and a polyfunctional aromatic acid chloride, and
the coating layer contains an aliphatic polymer containing a polyether moiety and a carboxylic acid polymer moiety.

[2] The composite semipermeable membrane according to the above [1], in which a weight fraction of the polyether moiety in the aliphatic polymer is 30% or more.

[3] The composite semipermeable membrane according to the above [2], in which a weight fraction of the carboxylic acid polymer moiety in the aliphatic polymer is 20% or more.

[4] The composite semipermeable membrane according to the above [2] or [3], in which the polyether moiety has one or more structures included in the following structure group (I).

[Chem. 1]

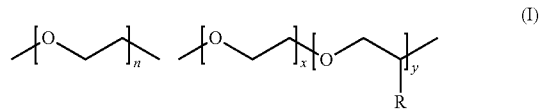

(in which n is an integer of 1 or more and 100 or less, x and y each independently are an integer of 1 or more and 50 or less, and R represents a methyl group.)

[5] The composite semipermeable membrane according to any one of the above [2] to [4], in which the aliphatic polymer has a crosslinked structure.

[6] The composite semipermeable membrane according to the above [5], in which the crosslinked structure includes an amide bond.

[7] The composite semipermeable membrane according to any one of the above [1] to [6], which satisfies the following conditions (A), (B), (C), and (D):

(A) intensity of a maximum peak between 3700 $cm^{-1}$ and 2900 $cm^{-1}$ is 0.08 or more in a difference spectrum of an IR spectrum measured under conditions of 25° C. and a relative humidity of 97% and an IR spectrum measured under conditions of 25° C. and a relative humidity of 3%;

(B) a peak top wave number of the difference spectrum between 3700 $cm^{-1}$ and 2900 $cm^{-1}$ is 3400 $cm^{-1}$ or more and 3550 $cm^{-1}$ or less;

(C) a formula (1): $(a+b)/(c+d+e) \geq 10$ (1) is satisfied, in which a, b, c, d, e are respectively count numbers in the cases of m/z of positive secondary ions=45.03, 59.05, 104.03, 108.07, 135.06 when a coating layer side of the composite semipermeable membrane is measured by using time-of-flight secondary ion mass spectrometry; and (D) a formula (2): f/(g+h+i)≥1 (2) is satisfied, in which f, g, h, i are respectively count numbers in the cases of m/z of negative secondary ions=71.02, 103.02, 107.06, 133.04 when the coating layer side of the composite semipermeable membrane is measured by using time-of-flight secondary ion mass spectrometry.

[8] The composite semipermeable membrane according to any one of the above [1] to [7], in which a polymer contained in the coating layer and a crosslinked aromatic polyamide contained in the separation functional layer are bonded to each other by an amide bond.

[9] The composite semipermeable membrane according to any one of the above [1] to [8], in which the coating layer has a fold structure including protruding portions and recessed portions, and a proportion of protruding portions having a height of 100 nm or more among the protruding portions of the fold structure is 80% or more.

[10] A composite semipermeable membrane element including the composite semipermeable membrane according to any one of the above [1] to [9].

Advantageous Effects of Invention

According to the present invention, a composite semipermeable membrane, which has a small decrease in the amount of produced water when operated particularly in seawater with a high salt concentration and a high heavy metal ion concentration, and exhibits a high amount of produced water, is obtained.

BRIEF DESCRIPTION OF DRAWINGS

FIG. 1 schematically illustrates a method for measuring the height of a protruding portion of a membrane surface.

DESCRIPTION OF EMBODIMENTS

The present invention will be described in detail below.

In the present description, all percentages and parts expressed by mass are the same as percentages and parts expressed by weight.

[1. Composite Semipermeable Membrane]

The composite semipermeable membrane according to the present invention includes a support membrane, a separation functional layer formed on the support membrane, and a coating layer for coating the separation functional layer. The support membrane includes a microporous support layer, and the separation functional layer is arranged on the microporous support layer. The above separation functional layer virtually has separation performances, and the support membrane does not virtually have performances of separating ions or the like although the support membrane is permeable to water. The support membrane can impart the strength to the separation functional layer.

(1) Support Membrane

In the present embodiment, the support membrane includes a substrate and a microporous support layer. However, the present invention is not limited to this configuration. For example, the support membrane may be composed of only the microporous support layer without the substrate.

(1-1) Substrate

Examples of the substrate include a polyester-based polymer, a polyamide-based polymer, a polyolefin-based polymer, mixtures or copolymers thereof, and the like. Among them, a fabric of a polyester-based polymer having high mechanical and thermal stability is particularly preferred. As the form of the fabric, a long fiber nonwoven fabric or a short fiber nonwoven fabric, and a woven or knitted fabric can be preferably used.

(1-2) Microporous Support Layer

In the present invention, the microporous support layer does not virtually have performances of separating ions or the like, and imparts the strength to the separation functional layer virtually having separation performances. The size and distribution of pores of the microporous support layer are not particularly limited. For example, preferred is a microporous support layer which has uniform micropores or micropores that gradually increase in size from a surface on a side where the separation functional layer is to be formed to the other surface, and in which the size of the micropores in the surface on the side where the separation functional layer to be formed is 0.1 nm or more and 100 nm or less. The materials used for the support layer or shapes thereof are not particularly limited.

As the materials of the microporous support layer, it is possible to use homopolymers or copolymers alone or in combination, such as polysulfones, polyethersulfones, polyamides, polyesters, cellulosic polymers, vinyl polymers, polyphenylene sulfides, polyphenylene sulfide sulfones, polyphenylene sulfones, and polyphenylene oxides. Here, as the cellulosic polymers, cellulose acetate, cellulose nitrate, and the like can be used, and as the vinyl polymers, polyethylene, polypropylene, polyvinyl chloride, polyacrylonitrile, and the like can be used.

Among them, preferred are homopolymers or copolymers such as polysulfones, polyamides, polyesters, cellulose acetates, cellulose nitrates, polyvinyl chlorides, polyacrylonitriles, polyphenylene sulfides, and polyphenylene sulfide sulfones. Cellulose acetates, polysulfones, polyphenylene sulfide sulfones, or polyphenylene sulfones can be more preferably exemplified. In these materials, polysulfones can be generally used since they have high chemical, mechanical and thermal stability and are easy to mold.

The mass average molecular weight (Mw) of the polysulfones, which is measured by gel permeation chromatography (GPC) using N-methylpyrrolidone as a solvent and polystyrene as a standard substance, is preferably 10,000 or more and 200,000 or less, and more preferably 15,000 or more and 100,000 or less.

When Mw of the polysulfones is 10,000 or more, preferred mechanical strength and heat resistance can be obtained for the microporous support layer. In addition, when Mw is 200,000 or less, the viscosity of the solution can be in an appropriate range, and good moldability can be achieved.

The thickness of the substrate and the thickness of the microporous support layer affect the strength of the composite semipermeable membrane and the packing density of the composite semipermeable membrane incorporated into an element. In order to obtain sufficient mechanical strength and packing density, the total thickness of the substrate and microporous support layer is preferably 30 μm or more and 300 μm or less, and more preferably 100 μm or more and 220 μm or less. The thickness of the microporous support layer is preferably 20 μm or more and 100 μm or less. In this description, the term "thickness" means an average value unless otherwise noted. The average value herein refers to an arithmetic mean value. That is, each of the thickness of the substrate and the thickness of the microporous support layer is determined by examining a cross-section thereof to measure the thickness thereof at 20 points at intervals of 20 μm along a direction (plane direction of the membrane) perpendicular to a thickness direction and calculating an average value of the thicknesses.

(1-3) Method for Forming Support Membrane

For example, an N,N-dimethylformamide (hereinafter, referred to as DMF) solution of the above polysulfones is applied onto a substrate, followed by subjecting to wet-coagulation in water, to obtain a microporous support layer.

(2) Separation Functional Layer (2-1) Chemical Structure of Separation Functional Layer The separation functional layer contains a crosslinked aromatic polyamide. In particular, the separation functional layer preferably contains a crosslinked aromatic polyamide as a main component. The term "main component" refers to a component that accounts for 50 wt % or more of the components of the separation functional layer. When the separation functional layer contains 50 wt % or more of the crosslinked aromatic polyamide, it is possible to exhibit high removal performances. The content of the crosslinked aromatic polyamide in the separation functional layer is preferably 80 wt % or more, and more preferably 90 wt % or more.

The crosslinked aromatic polyamide can be formed through the chemical reaction between polyfunctional aromatic amines and polyfunctional aromatic acid chlorides. Here, it is preferable that at least one of the polyfunctional aromatic amines and the polyfunctional aromatic acid chlorides contain a compound having three or more functional groups. As a result, a rigid molecular chain is obtained, and a favorable pore structure for removing micro solutes such as hydrated ions and boron is formed.

The polyfunctional aromatic amines refer to aromatic amines which have two or more amino groups, which are at least one of primary amino groups and secondary amino groups, in one molecule, and in which at least one of the amino groups is a primary amino group.

Examples of the polyfunctional aromatic amines include polyfunctional aromatic amines in which two amino groups are bonded to an aromatic ring in a positional relationship of any one of an ortho position, a meta position and a para position, such as o-phenylenediamine, m-phenylenediamine, p-phenylenediamine, o-xylylenediamine, m-xylylenediamine, p-xylylenediamine, o-diaminopyridine, m-diaminopyridine, and p-diaminopyridine, polyfunctional aromatic amines such as 1,3,5-triaminobenzene, 1,2,4-triaminobenzene, 3,5-diaminobenzoic acid, 3-aminobenzylamine, and 4-aminobenzylamine, and the like. In particular, in consideration of the selective separation property, the permeability and the heat resistance of a membrane, m-phenylenediamine, p-phenylenediamine, and 1,3,5-triaminobenzene are preferably used. Among them, it is more preferable to use m-phenylenediamine (hereinafter, also referred to as m-PDA) in view of the easy availability and easy handling. One of these polyfunctional aromatic amines may be used alone, or two or more thereof may be used in combination.

The polyfunctional aromatic acid chlorides refer to aromatic acid chlorides having at least two chlorocarbonyl groups in one molecule. Examples of trifunctional acid chlorides include trimesic acid chlorides and the like, and examples of bifunctional acid chlorides include biphenyl dicarboxylic acid dichloride, azobenzene dicarboxylic acid dichloride, terephthalic acid chloride, isophthalic acid chloride, naphthalene dicarboxylic acid chloride, and the like.

In consideration of the selective separation property and the heat resistance of a membrane, the polyfunctional aromatic acid chlorides are preferably a polyfunctional aromatic acid chloride having 2 to 4 carbonyl chloride groups in one molecule.

(2-2) Method for Forming Separation Functional Layer

The separation functional layer can be obtained by forming a crosslinked aromatic polyamide by allowing a polyfunctional aromatic amine and a polyfunctional aromatic acid chloride to chemically react. As a method of chemical reactions, the interfacial polymerization method is most preferred from the viewpoint of productivity and performances. The steps of the interfacial polymerization will be described below.

The steps of the interfacial polymerization include: (a) a step of bringing an aqueous solution containing polyfunctional aromatic amines into contact with a porous support layer; (b) a step of bringing an organic-solvent solution (solution A) in which polyfunctional aromatic acid chlorides are dissolved into contact with the porous support layer that has been in contact with the aqueous solution containing the polyfunctional aromatic amines; (c) a step of further bringing an organic-solvent solution (solution B) in which polyfunctional aromatic acid chlorides are dissolved into contact with the porous support layer, and heating them; and (d) a step of draining the organic solvent solutions after the reaction.

In this section, a case where a support membrane includes a substrate and a microporous support layer is taken as an example, and in a case where the support membrane has another configuration, the term "microporous support layer" may be replaced with the term "support membrane".

In the step (a), a concentration of the polyfunctional aromatic amines in the aqueous solution containing polyfunctional aromatic amines is preferably within a range of 0.1 wt % or more and 20 wt % or less, and more preferably within a range of 0.5 wt % or more and 15 wt % or less. When the concentration of the polyfunctional aromatic amines is within this range, sufficient solute removal performances and water permeability can be obtained.

It is preferable that the aqueous solution containing polyfunctional aromatic amines is brought into contact with the microporous support layer evenly and continuously. Specific examples of the contact method include a method in which the aqueous solution containing polyfunctional aromatic amines is applied to the microporous support layer by coating, a method in which the microporous support layer is immersed in the aqueous solution containing polyfunctional aromatic amines, and the like. The time period during which the microporous support layer is in contact with the aqueous solution containing polyfunctional aromatic amines is preferably 1 second or more and 10 minutes or less, and more preferably 10 seconds or more and 3 minutes or less.

After the contact of the aqueous solution containing polyfunctional aromatic amines with the microporous support layer, the solution is sufficiently drained not to allow droplets to remain on the membrane. If the solution is sufficiently drained, it is possible to prevent a decrease in the removal performance due to the fact that the remaining portion of the droplets becomes a membrane defect after the formation of the microporous support layer. Examples of a method for the solution-draining include: a method in which the support membrane which has contacted the aqueous solution containing polyfunctional aromatic amines is held vertically to allow the excess aqueous solution to flow down naturally, as described in JP-A-2-78428; a method in which an airflow such as nitrogen is blown from an air nozzle to forcedly drain the solution; and the like. After the solution-draining, the membrane surface may be dried to remove some of the water contained in the aqueous solution.

The concentration of the polyfunctional aromatic acid chlorides in the organic-solvent solutions (the solution A and the solution B) is preferably within a range of 0.01 wt % or more and 10 wt % or less, and more preferably within a range of 0.02 wt % or more and 2.0 wt % or less. The above range is preferred because a sufficient reaction rate is obtained when the concentration of the polyfunctional aromatic acid chlorides is 0.01 wt % or more, and the occurrence of side reactions can be inhibited when the concentration thereof is 10 wt % or less.

The organic solvent is preferably a water-immiscible organic solvent which dissolves the polyfunctional aromatic acid chlorides and does not damage the support membrane. Any such organic solvent, which is inert to the polyfunctional aromatic amines and the polyfunctional aromatic acid chlorides, may be used. Preferred examples thereof include hydrocarbon compounds such as n-nonane, n-decane, n-undecane, n-dodecane, isooctane, isodecane, and isododecane, and mixed solvents thereof.

A method for contacting the organic-solvent solution of the polyfunctional aromatic acid chlorides with the microporous support layer that has been in contact with the aqueous solution containing polyfunctional aromatic amines may be performed in the same manner as a method of coating the microporous support layer with the aqueous solution containing polyfunctional aromatic amines.

In the step (c), the solution B in which polyfunctional aromatic acid chlorides are dissolved is brought into contact with the porous support layer, followed by heating. The temperature at which the heat treatment is performed is 50° C. or higher and 180° C. or lower, and preferably 60° C. or higher and 160° C. or lower. By performing heating within this range, synergistic effects of promoting the interfacial polymerization reaction by the heat and the concentration of the solution can be obtained.

In the step (d), the organic solvent is removed by draining the organic-solvent solution after the reaction. Examples of methods for removal of the organic solvent include a method in which the membrane is held vertically to allow the excess organic solvent to flow down naturally so as to be removed, a method for drying and removing the organic solvent by blowing air with a blower, a method for removing the excess organic solvent by a mixed fluid of water and air, and the like.

(3) Coating Layer

The composite semipermeable membrane includes a coating layer on the surface. The coating layer virtually has a function of inhibiting the adhesion of the dirt.

(3-1) Chemical Structure of Coating Layer

The coating layer contains an aliphatic polymer having a polyether moiety and a carboxylic acid polymer moiety.

When heavy metal ions adhere to the membrane, the water permeability decreases. In contrast, since the carboxylic acid polymer moiety can hold hydrated water, it is possible to prevent adhesion of heavy metals, and further to prevent a decrease in water permeability caused by the adhesion of heavy metals. In addition, when the concentration of salts in water is increased, the amount of hydrated water that can be held by the carboxylic acid polymer moiety is reduced. However, polymers that constitute the coating layer as described in the present invention include not only a carboxylic acid polymer moiety but also a polyether moiety, so that the motility of the hydrated water can be improved, and the fouling of the membrane can be effectively inhibited even if the amount of the hydrated water is reduced.

Thus, a membrane, which has a small decrease in the amount of produced water even when operated under conditions of a high heavy metal ion concentration and a high salt concentration, is realized.

The polyether moiety is a moiety having an ether group and two or more carbon atoms. The polyether moiety preferably contains a structure represented by —O—CH$_2$—CH$_2$— and —O—CH(CH$_3$)—CH$_2$—. The polyether moiety may be linear or branched. Namely, the polyether moiety is preferably a linear or branched polymer including a polyalkylene oxide moiety, especially a polyethylene glycol moiety or a polypropylene glycol moiety. More specifically, the polyether moiety preferably contains at least one structure included in the following structure group (I).

[Chem. 2]

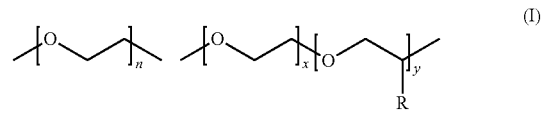

(I)

(Here, n is an integer of 1 or more and 100 or less, x and y each independently are an integer of 1 or more and 50 or less, and R represents a methyl group.)

In order to prevent a decrease in the amount of produced water when operated in the seawater having a high salt concentration and a high heavy metal ion concentration, the weight fraction of the polyether moiety in the coating layer is preferably 30% or more.

The aliphatic polymer can control the amount of water contained in the coating layer and provide moderate hydrophilicity by containing the carboxylic acid polymer moiety. The aliphatic polymer can function as a starting point of the crosslinking and a reaction with the membrane described below by having a carboxylic acid terminal. Examples of the carboxylic acid polymer include a polymer having a terminal carboxyl group, such as polyacrylic acid, polymethacrylic acid, and polyglutamic acid, or a copolymer containing the above polymer moiety. In that case, the above polymer may be linear or branched. In order to impart the above function, the weight fraction of the carboxylic acid polymer moiety in the coating layer is preferably 5% or more, and more preferably 20% or more. A polymer, such as nylon and polyesters in which carboxyl groups are mostly esterified or amidated and do not remain as a functional group virtually, is unsuitable from the above viewpoint and is not included in the carboxylic acid polymer. The content of the carboxylic acid polymer moiety is preferably 50% or less when considering the balance with an ether moiety.

By having a crosslinked structure, the aliphatic polymer can continue to maintain the function even when being cut at one location, so that the aliphatic polymer is preferred from the viewpoint of durability. Here, the term "crosslinked structure" means a structure obtained by linking polymers in a mesh form by covalent bonds. Examples of the crosslinked structure include a structure in which linear polymers are crosslinked using a crosslinking agent, a structure in which a three-dimensional network polymer, a pendant polymer or a dendrimer is connected at a plurality of locations, and the like.

There are various methods for crosslinking, and examples thereof include methods using an addition reaction, a radical reaction, and a condensation reaction, and the like. Among them, a method for forming an amide bond by condensation by using residues of a carboxylic acid polymer is preferred because a crosslinked polymer with moderate chemical durability and hydrophilicity can be easily formed by this method. When a polyether having an amino group is used, the amino group of the polyether can be condensed with a carboxyl group of a carboxylic acid polymer, thereby forming an amide bond. Examples of the polyethers having an amino group include JEFFAMINE (registered trademark) Diamines (D, ED, EDR series) and JEFFAMINE (registered trademark) Triamines (T series), which are manufactured by Huntsmann, and the like.

(3-2) Method for Forming Coating Layer

The coating layer is formed on a surface of the separation functional layer. The coating layer may be formed by applying the aliphatic polymer onto the separation functional layer, or the coating layer may be formed by immersing a membrane containing the separation functional layer in a solution containing the aliphatic polymer. The coating layer may be formed by allowing a substance as a raw material of the aliphatic polymer to react on the surface of the separation functional layer. Further, the coating layer may be formed by passing-through treatment with a solution of the aliphatic polymer after producing a composite semipermeable membrane element described below.

When a polymer having an amino group is condensed with a carboxylic acid polymer by amide bonds to form a polymer, a carboxyl group of the carboxylic acid polymer may be condensed with an amino group after being converted into a chlorocarbonyl group, or may be condensed by using a condensation accelerator. Examples of the condensation accelerator include sulfuric acid, 4-(4,6-dimethoxy-1,3,5-triazin-2-yl)-4-methylmorpholinium chloride (DMT-MM), 1-(3-dimethylaminopropyl)-3-ethylcarbodiimide hydrochloride, N,N'-dicyclohexylcarbodiimide, N,N'-diisopropylcarbodiimide, N,N'-carbonyldiimidazole, 1,1'-carbonyldi(1,2,4-triazole), 1H-benzotriazol-1-yloxytris(dimethylamino)phosphonium hexafluorophosphate, (7 azabenzotriazol-1-yloxy)tripyrrolidinophosphonium hexafluorophosphate, chlorotripyrrolidinophosphonium hexafluorophosphate, bromotris(dimethylamino)phosphonium hexafluorophosphate, 3-(diethoxyphosphoryloxy)-1,2,3-benzotriazin-4(3H)-one, O-(benzotriazol-1-yl)-N,N,N',N'-tetramethyluronium hexafluorophosphate, O-(7-azabenzotriazol-1-yl)-N,N,N',N'-tetramethyluronium hexafluorophosphate, O-(N-succinimidyl)-N,N,N',N'-tetramethyluronium tetrafluoroborate, O-(N-succinimidyl)-N,N,N',N'-tetramethyluronium hexafluorophosphate, O-(3,4-dihydro-4-oxo-1,2,3-benzotriazin-3-yl)-N,N,N',N'-tetramethyluronium tetrafluoroborate, (4,6-dimethoxy-1,3,5-triazin-2-yl)-(2-octoxy-2-oxoethyl)dimethylammonium trifluoromethanesulfonate, S-(1-oxide-2-pyridyl)-N,N,N',N'-tetramethylthiuronium tetrafluoroborate, 0-[2-oxo-1 (2H)-pyridyl]-N,N,N',N'-tetramethyluronium tetrafluoroborate, {{[(1-cyano-2-ethoxy-2-oxoethylidene)amino]oxy}-4-morpholinomethylene}dimethylammonium hexafluorophosphate, 2-chloro-1,3-dimethylimidazolinium hexafluorophosphate, 1-(chloro-1-pyrrolidinylmethylene) pyrrolidinium hexafluorophosphate, 2-fluoro-1,3-dimethylimidazolinium hexafluorophosphate, fluoro-N,N,N',N'-tetramethylformamidinium hexafluorophosphate, and the like. The reaction time and the concentration can be appropriately adjusted depending on the solvent, the condensing agent, and structures of the compound to be used, and from the viewpoint of the productivity, the reaction time is preferably 24 hours or less, more preferably 12 hours or less, still more preferably 6 hours or less, and particularly preferably 1 hour or less. After completion of the reaction, the residue compound may be removed and the product may be purified.

(3-3) Chemical bonds between coating layer and separation functional layer

The coating layer and the separation functional layer may be linked to each other by chemical bonds. It is more preferred because the coating layer can exist more stably when chemical bonds are formed between the coating layer and the separation functional layer. The chemical bonds between the coating layer and the separation functional layer are preferably a covalent bond. From the viewpoints of using a functional group possessed by a polymer constituting each layer and maintaining the chemical durability at a high level, the chemical bonds between the coating layer and the separation functional layer are particularly preferably an amide bond. Specifically, an amide bond can be formed between the coating layer and the separation functional layer by forming an amide bond through a reaction between an amino group of an aliphatic polymer and a carboxyl group of a crosslinked aromatic polyamide forming a separation functional layer, or forming an amide bond through a reaction between a carboxyl group of an aliphatic polymer and an amino group of a crosslinked aromatic polyamide forming a separation functional layer. The formation of the present amide bond is performed when the crosslinked aromatic polyamide constituting the separation functional layer and the aliphatic polyamide are in contact with each other. Specifically, a chemical reaction may be performed between the coating layer and the separation functional layer when a solution containing a pre-synthesized polymer is applied onto a separation functional layer by coating to form the coating layer. Alternatively, the chemical reaction may be performed between the coating layer and the separation functional layer when a membrane containing the separation functional layer is immersed in the solution containing the pre-synthesized polymer to form the coating layer. Further, the chemical reaction may be performed between the coating layer and the separation functional layer when the solution containing the polymer is subjected to liquid passing treatment after producing the composite semipermeable membrane element described below to form the coating layer. Alternatively, when the coating layer is formed by allowing the polymer to be the coating layer to react directly on the surface of the separation functional layer, the polymer may form amide bonds with the crosslinked aromatic polyamide forming the separation functional layer at the same time. During the formation of amide bonds between the coating layer and the separation functional layer, the carboxyl group is preferably in a state of having a high reaction activity as necessary. For example, a reaction between a chlorocarbonyl group possessed by the crosslinked aromatic polyamide immediately after the interfacial polymerization and an amino group possessed by the above aliphatic polymer may be utilized, or various reaction aids (condensation accelerators) are preferably used for forming amide bonds in high efficiency and in a short time. As the condensation accelerator, the same compounds as those exemplified in the item (3-2) can be preferably used.

The reaction time and the concentration of the formation of amide bonds between the coating layer and the separation functional layer can be appropriately adjusted depending on the solvent, the condensing agent, and chemical structures of the polymer used, and from the viewpoint of the productivity, the reaction time is preferably 24 hours or less, more preferably 1 hour or less, and still more preferably 10 minutes or less. After the completion of the reaction, it is preferable that the obtained composite semipermeable membrane is washed with water, hot water or a suitable organic solvent to remove reactive compounds.

(3-4) Physical Properties of Coating Layer

As a result of intensive studies, the present inventors have found that a state of water contained in the coating layer affects the fouling resistance. Specifically, it has been found that the effect of preventing the adhesion of dirt is enhanced and a decrease in the amount of produced water during the operation in seawater with a high salt concentration and a high heavy metal ion concentration is reduced when intensity of the maximum peak between 3700 $cm^{-1}$ and 2900 $cm^{-1}$, which represents the stretching vibration of the O—H bond of a water molecule, is 0.08 or more in a difference spectrum which is obtained by subtracting, from an infrared absorption spectrum (IR spectrum) measured from a coating layer side of a composite semipermeable membrane equilibrated at a temperature of 25° C. and a relative humidity of 97%, an IR spectrum measured from the coating layer side of the composite semipermeable membrane equilibrated at a temperature of 25° C. and a relative humidity of 3%, and the peak top wave number between 3700 $cm^{-1}$ and 2900 $cm^{-1}$, which represents the stretching vibration of the O—H bond of a water molecule, is 3400 $cm^{-1}$ or more and 3550 $cm^{-1}$ or less in a difference spectrum which is obtained by subtracting, from an IR spectrum measured from a coating layer side of a composite semipermeable membrane equilibrated at a temperature of 25° C. and a relative humidity of 97%, an IR spectrum measured from the coating layer side of the composite semipermeable membrane equilibrated at a temperature of 25° C. and a relative humidity of 3%. As a method for adjusting a relative humidity at a constant temperature, a saturated salt method described in JIS B 7920 can be used. The IR spectrum of a laminated semipermeable membrane can be measured by Attenuated Total Reflectance (ATR) infrared spectroscopy.

As a result of intensive studies, the present inventors have found that, as for the membrane obtained by applying the above polymer to the crosslinked aromatic polyamide, the decrease in the amount of produced water during operation in the seawater with a high salt concentration and a high heavy metal ion concentration is reduced in a case where the peaks of positive and negative secondary ions satisfy the relationships of the following formulas (1) and (2) at the same time when the measurement is performed from the coating layer side of the composite semipermeable membrane by using time-of-flight secondary ion mass spectrometry.

$$(a+b)/(c+d+e) \geq 10 \quad (1)$$

in which a, b, c, d, e are count numbers in the cases of m/z of positive secondary ions=45.03, 59.05, 104.03, 108.07, 135.06, respectively.

$$f/(g+h+i) \geq 1 \quad (2)$$

in which f, g, h, i are count numbers in the cases of m/z of negative secondary ions=71.02, 103.02, 107.06, 133.04, respectively.

The m/z values 45.03 and 59.05 of the positive secondary ions belong to ions ($C_2H_5O^+$, $C_3H_7O^+$), which are derived from a polyalkylene oxide, when the aliphatic polymer contains a polyalkylene oxide moiety as a polyether moiety, and m/z values 104.03, 108.07, and 135.06 belong to ions ($C_7H_4O^+$, $C_6H_8N_2^+$, $C_7H_7N_2O^+$) derived from a partial structure of aromatic polyamide. The m/z value 71.02 of a negative secondary ion belongs to an ion ($C_3H_3O_2^-$), which is derived from a polyacrylic acid moiety, when the aliphatic polymer contains a polyacrylic acid moiety, and the m/z values 103.02, 107.06, and 133.04 belong to ions ($C_7H_3O^-$, $C_6H_7N_2^-$, $C_7H_5N_2O^-$) derived from a partial structure of aromatic polyamide.

(4) Shapes of Membrane Surface

As a result of intensive studies, the present inventors have found that high water permeability is exhibited when the proportion of protruding portions which have a height of 100 nm or more, of the membrane surface is 80% or more.

The protruding portion of the membrane surface in the present invention refers to a protruding portion having a height that is ⅕ or more of a ten-point average surface roughness. The ten-point average surface roughness is a value obtained by the following calculation method. First, a cross-section in a direction perpendicular to a membrane surface is observed by an electron microscope at the following magnification. In the obtained cross-sectional image, a surface (indicated by the symbol "1" in FIG. 1) appears as a curve of a fold structure in which protruding portions and recessed portions are continuously repeated. As for this curve, a roughness curve defined based on ISO 4287:1997 is determined. A cross-sectional image is extracted with a width of 2.0 μm in the direction of an average line of the above roughness curve (FIG. 1).

The average line is a straight line defined based on ISO 4287:1997 and is a straight line that is drawn such that the total areas of the regions enclosed by the average line and the roughness curve, at the measurement length, are equal above and below the average line.

In the image extracted with a width of 2.0 μm, the heights of protruding portions and the depths of recessed portions are respectively measured with the above average-line as a baseline. An average value is calculated for absolute values of heights H1 to H5 of five protruding portions from the highest protruding portion to a protruding portion having the fifth height with the heights decreasing gradually, and an average value is calculated for absolute values of depths D1 to D5 of five recessed portions from the deepest recessed portion to a recessed portion having the fifth depth with the depths decreasing gradually. Further, a sum of absolute values of the two obtained average values is calculated. The thus-obtained sum is a ten-point average surface roughness.

The heights of the protruding portions can be measured by a transmission electron microscope. First, a sample is embedded with a water-soluble polymer to prepare ultra-thin sections for the transmission electron microscope (TEM). Any polymer can be used as the water-soluble polymer as long as it can retain the shape of the sample, and for example, PVA or the like can be used. Next, in order to facilitate the observation of cross-sections, the sample is stained with $OsO_4$ and is cut by an ultra-microtome to prepare ultra-thin sections. A cross-sectional photograph of the obtained ultra-thin sections is captured by using TEM.

The cross-sectional photograph is read into image analysis software to analyze the heights of the protruding portions. In this case, the heights of the protruding portions are a value measured for protruding portions having a height that is ⅕ or more of the ten-point average surface roughness. The heights of the protruding portions are measured as follows. When any 10 cross-sections are observed in the composite semipermeable membrane, the height of the protruding portion, which is ⅕ or more of the ten-point average surface roughness described above, is measured in each cross-section. Here, each cross-section has a width of 2.0 μm in the direction of the average line of the above roughness curve.

The height of the protruding portion affects a surface area of the membrane. The proportion of protruding portions in the present invention, which have a height of 100 nm or more, is 80% or more, so that high water permeability can be obtained. The proportion of protruding portions having a height of 100 nm or more is more preferably 84% or more.

(5) Utilization of Composite Semipermeable Membranes

The composite semipermeable membrane is preferably used as a spiral composite semipermeable membrane element which is wound around a cylindrical water collection pipe, which is provided with a large number of pores, together with a feed-water flow path material such as a plastic net, a permeated water flow path material such as a tricot, and a film for increasing the pressure resistance as required. Further, the elements may be connected in series or in parallel to form a composite semipermeable membrane module housed in a pressure vessel.

The above composite semipermeable membrane, or the element thereof or the module may be combined with a pump for supplying feed water to the composite semipermeable membrane, the element thereof or the module, and with a device for pre-treating the feed water to constitute a fluid separation device. The separation device is used so that the feed water is separated into permeated water, such as drinking water, and concentrated water, which does not permeate the membrane, to obtain water for interest.

Examples of the feed water to be treated by the composite semipermeable membrane according to the present invention include liquid mixtures containing total dissolved solids (TDS) of 500 mg/L or more and 100 g/L or less, such as seawater, brine, and wastewater. In general, TDS refers to a content of total dissolved solids and is represented by "mass±volume" or "weight ratio". According to the definition, the TDS value can be calculated from a weight of residues obtained by evaporating the solution, having been filtered by a 0.45-micron filter, at a temperature of 39.5° C. or higher and 40.5° C. or lower, but is converted from practical salinity (S) more conveniently.

The operating pressure when water to be treated permeates the composite semipermeable membrane is preferably 0.5 MPa or more and 10 MPa or less in consideration of the durability of the composite semipermeable membrane and the fact that the energy required for operation also increases although the solute removal rate is improved when the operating pressure of the fluid separation device is high. The temperature of the feed water is preferably 5° C. or higher and 45° C. or lower since the solute removal rate decreases when the temperature increases and a membrane permeation flux also decreases when the temperature decreases. In addition, operation in a neutral range is preferred since a scale of magnesium or the like may be generated in the case of feed water having a high solute concentration such as seawater when the pH of the feed water is increased, and there is concern about deterioration of the membrane due to high pH operation.

EXAMPLES

The present invention will be described in more detail with reference to Examples. However, the present invention is not limited in any way.

(1) Preparation of Membrane

Reference Example 1

A 16.0 mass % DMF solution of polysulfone (PSf) was cast with a thickness of 200 μm at a condition of 25° C. onto a polyester nonwoven fabric (air permeability: 2.0 cc/cm$^2$/sec), followed by immediately immersing in pure water and allowing to stand for five minutes, and a porous support membrane was prepared.

The obtained porous support membrane was immersed in a 3 mass % aqueous solution of m-phenylenediamine (m-PDA) for two minutes and then was slowly pulled up in the vertical direction, and nitrogen was blown from an air nozzle to remove the excess aqueous solution from a surface of the support membrane. Then, in the environment controlled at a room temperature of 40° C., a decane solution having a temperature of 40° C. and containing 0.165 mass % of trimesic acid chloride (TMC) was applied to the porous support membrane such that the surface of the porous support membrane was completely wet, the porous support membrane was allowed to stand for one minute, followed by holding the membrane vertically to drain and remove the excess solution, and heating and drying for one minute at 80° C., and a composite semipermeable membrane having a crosslinked aromatic polyamide separation functional layer was obtained.

Reference Example 2

A 16.0 mass % DMF solution of polysulfone (PSf) was cast with a thickness of 200 μm at a condition of 25° C. onto a polyester nonwoven fabric (air permeability: 2.0 cc/cm$^2$/sec), followed by immediately immersing in pure water and allowing to stand for five minutes, and a porous support membrane was prepared.

The obtained porous support membrane was immersed in a 3 mass % aqueous solution of m-phenylenediamine (m-PDA) for two minutes and then was slowly pulled up in the vertical direction, and nitrogen was blown from an air nozzle to remove the excess aqueous solution from a surface of the support membrane. Then, in the environment controlled at a room temperature of 25° C., a decane solution having a temperature of 25° C. and containing 0.165 mass % of trimesic acid chloride (TMC) was applied to the porous support membrane such that the surface of the porous support membrane was completely wet, the porous support membrane was allowed to stand for one minute, followed by holding the membrane vertically to drain and remove the excess solution, and heating and drying for one minute at 80° C., and a composite semipermeable membrane having a crosslinked aromatic polyamide separation functional layer was obtained.

Examples 1 to 12

A compound shown in Tables 1 and 2 was dissolved in pure water at a concentration shown in Table 1, then 4-(4,6-dimethoxy-1,3,5-triazin-2-yl)-4-methylmorpholinium chloride was dissolved in the obtained solution as a condensing agent to reach a concentration of 1000 ppm, followed by performing stirring for one hour at 25° C., and a polymer solution was prepared.

The obtained polymer solution was applied to a surface on a separation functional layer side of the composite semipermeable membrane having the crosslinked aromatic polyamide separation functional layer, which was obtained in Reference Example 1, followed by allowing to stand for 10 minutes at 25° C. and washing with pure water, and a composite semipermeable membrane having a coating layer was prepared.

Examples 13 and 14

A compound shown in Tables 1 and 2 was dissolved in pure water at a concentration shown in Table 1, followed by performing stirring for five minutes at 25° C., and a polymer solution was prepared.

The obtained polymer solution was applied to a surface on a separation functional layer side of the composite semipermeable membrane having the crosslinked aromatic polyamide separation functional layer, which was obtained in Reference Example 1, followed by allowing to stand for one hour at 25° C., and a composite semipermeable membrane having a coating layer was prepared.

Examples 15 and 16

A compound shown in Tables 1 and 2 was dissolved in pure water at a concentration shown in Table 1, then 4-(4,6-dimethoxy-1,3,5-triazin-2-yl)-4-methylmorpholinium chloride was dissolved in the obtained solution as a condensing agent to reach a concentration of 1000 ppm, followed by performing stirring for one hour at 25° C., and a polymer solution was prepared. The obtained polymer solution was applied to a surface on a separation functional layer side of the composite semipermeable membrane having the crosslinked aromatic polyamide separation functional layer, which was obtained in Reference Example 2, followed by allowing to stand for 10 minutes at 25° C. and washing with pure water, and a composite semipermeable membrane having a coating layer was prepared.

Example 17

A polymer solution was prepared in the same manner as Example 3, and then the polymer solution was concentrated and purified to remove the condensing agent. The polymer was dissolved in pure water again to reach a concentration of 1200 ppm, and then a composite semipermeable membrane was produced by the same operation as in Example 3.

Comparative Examples 1 to 3

A compound shown in Tables 1 and 2 was dissolved in pure water at a concentration shown in Table 1, followed by performing stirring for five minutes at 25° C., and a polymer solution was prepared.

The obtained polymer solution was applied to a surface on a separation functional layer side of the composite semipermeable membrane having the crosslinked aromatic polyamide separation functional layer, which was obtained in Reference Example 1, followed by allowing to stand for 15 minutes at 25° C. and washing with pure water, and a composite semipermeable membrane having a coating layer was prepared.

(2) Infrared absorption (IR) measurement (Equilibration of composite semipermeable membrane under conditions of constant temperature and relative humidity)

The relative humidity of the air in equilibrium with a saturated aqueous solution of a salt depends on the kind of the salt and the temperature of the solution. Thus, by keeping a vessel, in which the saturated aqueous solution of the salt is placed, at a constant temperature, it is possible to create an equilibrium state and generate a predetermined relative humidity. The method for adjusting the relative humidity in this manner is referred to as a saturated salt method and is also described in JIS B 7920.

In this test, the relative humidity was adjusted by using the saturated salt method to equilibrate the composite semipermeable membrane. Specifically, about 200 mL of a saturated salt solution was placed in a vessel having a capacity of 2.7 L, a membrane having been soaked in water (area: about 2 cm$^2$) was placed in the vessel in a wet state and was not in contact with the saturated salt solution, followed by sealing the vessel, and the vessel was allowed to stand for 30 days in an incubator at 25° C.

(IR Spectrum)

The IR spectrum was measured by Attenuated Total Reflectance (ATR) infrared spectroscopy. Avatar 360 FT-IR measurement machine manufactured by Nicolet Co., Ltd. was used as a measurement machine, and a single reflection horizontal ATR measurement device (OMNI-Sampler) manufactured by the same corporation, and an ATR crystal made of germanium were used as accessories for measuring the total internal reflection, to measure a surface of a sample. As measurement conditions, the resolution was set to 4 cm$^{-1}$ and the number of scans was set to 256 times. Measurement was performed immediately after obtaining the composite semipermeable membrane equilibrated under the above conditions. The obtained spectrum was represented by absorbance and was subjected to auto baseline correction.

(3) Time-of-Flight Secondary Ion Mass Spectrometry Measurement

A composite semipermeable membrane obtained in the examples of the above item (1) was dried at room temperature under vacuum and was subjected to the time-of-flight secondary ion mass spectrometry measurement by using TOF SIMS 5 device (manufactured by ION TOF) (secondary ion polarity: positive, mass range (m/z)=0 to 200, raster size: 300 μm, number of scans: 16, number of pixels (one side)=256, measurement vacuum degree=$4 \times 10^{-7}$ Pa or less, primary ion species: $Bi_3^{++}$, primary ion acceleration voltage=25 kV, pulse width=12.5, 13.3 ns, bunching: yes, charge neutralization: yes, late acceleration: 10 kV).

For the surface on the coating layer side of the composite semipermeable membrane, the count numbers in the cases of m/z of positive secondary ions=45.03, 59.05, 104.03, 108.07, 135.06 were determined respectively, and the count numbers in the cases of m/z of positive secondary ions=45.03, 59.05, 104.03, 108.07, 135.06 were respectively set as a, b, c, d, e to determine the value of (a+b)/(c+d+e). Next, the polarity of secondary ions was set to be negative, and the measurement was performed in the same manner. The count numbers in the cases of m/z of negative secondary ions=71.02, 103.02, 107.06, 133.04 were determined respectively, and those were respectively set as f, g, h, i to determine the value of f/(g+h+i).

Based on a peak intensity ratio when a coating layer model polymer with a known weight fraction was applied to a silicon wafer and the measurement was performed in the same method, the weight fraction of the polyether moiety and the polyacrylic acid moiety in the coating layer of the composite semipermeable membrane was calculated.

(4) Height of Protruding Portions

A composite semipermeable membrane containing a coating layer was embedded with PVA, stained with $OsO_4$, and cut by an ultra-microtome to prepare ultra-thin sections. Cross-sectional photographs of the obtained ultra-thin sections were captured by using a transmission electron microscope. The cross-sectional photographs captured by the transmission electron microscope were read into image analysis software, a height of a protruding portion and a depth of a recessed portion in a distance of a length of 2.0 µm were measured, and the ten-point average surface roughness was calculated as described above. Based on the ten-point average surface roughness, a height of protruding portions having a height of 1/5 or more of the ten-point average surface roughness was measured. The above measurement was repeated until the height of the protruding portions exceeded 100 points, and a proportion of protruding portions having a height of 100 nm or more among the above protruding portions was determined.

(5) Performance Evaluation of Composite Semipermeable Membrane

Seawater (Total Dissolved Solids (TDS) concentration: 3.5%), which was adjusted to have a temperature of 25° C. and a pH of 7, was supplied at operating pressure of 5.5 MPa to the obtained composite semipermeable membrane so as to perform a membrane water flow test, and performances at the time of manufacturing (initial performances) were determined.

The salt removal rate was calculated from the following formula.

Salt removal rate (%)=100×{1−(TDS concentration in permeated water/TDS concentration in feed water)}

The permeate flow rate ($m^3/m^2/day$) was determined from the amount of permeated water (cubic meter) per day per square meter of the membrane surface, which was obtained under the above conditions.

(6) Fouling Resistance Test

After the evaluation of the performances at the time of the manufacturing in the above item (5), the TDS concentration was increased to 60,000 ppm, and seawater to which iron (III) chloride was added to reach a concentration of 10 ppm was subjected to water flow operation for 1.5 hours at the pressure of 7.1 MPa. Then, a membrane water flow test was performed again according to the method of the above item (5), and the permeate flow rate was measured to calculate a ratio of this permeate flow rate to the one during the manufacturing.

The membrane performances of the composite semipermeable membranes obtained in the above Examples and Comparative Examples are shown in Table 4. As shown in Examples, it can be seen that the composite semipermeable membrane of the present invention has both a small decrease in the amount of produced water in seawater with a high salt concentration and a high heavy metal ion concentration and high water permeability.

TABLE 1

| | | Chemical structure | | Concentration (ppm) | |
| | | | Coating layer | | |
| | Separation functional layer | Compound 1 | Compound 2 | Compound 1 | Compound 2 |
|---|---|---|---|---|---|
| Example 1 | Reference Example 1 | Polyacrylic acid (molecular weight 5000) | Referring to Table 2 | 300 | 900 |
| Example 2 | Reference Example 1 | | | 1000 | 3000 |
| Example 3 | Reference Example 1 | | | 300 | 900 |
| Example 4 | Reference Example 1 | | | 1000 | 3000 |
| Example 5 | Reference Example 1 | | | 300 | 900 |
| Example 6 | Reference Example 1 | | | 1000 | 3000 |
| Example 7 | Reference Example 1 | | | 600 | 600 |
| Example 8 | Reference Example 1 | | | 2000 | 2000 |
| Example 9 | Reference Example 1 | | | 2000 | 2000 |
| Example 10 | Reference Example 1 | | | 3000 | 1000 |
| Example 11 | Reference Example 1 | | | 3000 | 1000 |
| Example 12 | Reference Example 1 | | | 600 | 3400 |
| Example 13 | Reference Example 1 | | | 300 | 900 |
| Example 14 | Reference Example 1 | | | 1000 | 3000 |
| Example 15 | Reference Example 2 | | | 300 | 900 |
| Example 16 | Reference Example 2 | | | 1000 | 3000 |
| Example 17 | Reference Example 1 | | | 300 | 900 |
| Comparative Example 1 | Reference Example 1 | Polyacrylic acid (molecular weight 5000) | — | 1000 | — |
| Comparative Example 2 | Reference Example 1 | Poly(2-ethyl-2-oxazoline) (molecular weight 500000) | — | 1000 | — |
| Comparative Example 3 | Reference Example 1 | Polyvinyl alcohol (polymerization degree 2000, saponification degree ≥99%) | — | 2500 | — |

TABLE 2

| | | Compound 2 |
|---|---|---|
| Example | 1 | (IV) y ≈ 40, x + z ≈ 6 |
| Example | 2 | (IV) y ≈ 40, x + z ≈ 6 |
| Example | 3 | (IV) y ≈ 13, x + z ≈ 6 |
| Example | 4 | (IV) y ≈ 13, x + z ≈ 6 |
| Example | 5 | (III) x ≈ 19, y = 3 |
| Example | 6 | (III) x ≈ 19, y = 3 |
| Example | 7 | (IV) y ≈ 40, x + z ≈ 6 |
| Example | 8 | (IV) y ≈ 40, x + z ≈ 6 |
| Example | 9 | (IV) y ≈ 13, x + z ≈ 6 |
| Example | 10 | (IV) y ≈ 40, x + z ≈ 6 |
| Example | 11 | (IV) y ≈ 13, x + z ≈ 6 |

TABLE 2-continued

|  |  | Compound 2 |
|---|---|---|
| Example | 12 | (IV) y ≈ 13, x + z ≈ 6 |
| Example | 13 | (IV) y ≈ 13, x + z ≈ 6 |
| Example | 14 | (IV) y ≈ 13, x + z ≈ 6 |
| Example | 15 | (IV) y ≈ 13, x + z ≈ 6 |
| Example | 16 | (IV) y ≈ 13, x + z ≈ 6 |
| Example | 17 | (IV) y ≈ 13, x + z ≈ 6 |
| Comparative Example | 1 | — |
| Comparative Example | 2 | — |
| Comparative Example | 3 | — |

[Chem. 3]

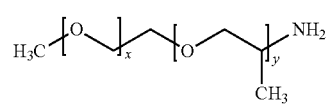
(III)

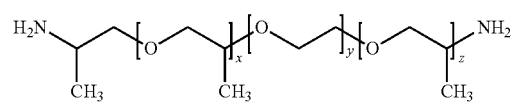
(IV)

TABLE 3

| | | IR measurement | | Protruding portions Proportion of protruding portions of 100 nm or more (%) | Time-of-flight secondary ion mass spectrometry measurement Values of | | Weight fraction of compositions in non-aromatic polymers | | | |
|---|---|---|---|---|---|---|---|---|---|---|
| | | Intensity of maximum peak (—) | Peak top wave number (cm$^{-1}$) | | (a + b)/(c + d + e) (—) | Values of (f/(g + h + i)) | Polyether (%) | Polyacrylic acid (%) | Crosslinking/ non-crosslinking (—) | Amide bond with membrane |
| Example | 1 | 0.12 | 3452 | 93 | 20 | 2 | 77 | 23 | Crosslinking | Yes |
| Example | 2 | 0.15 | 3448 | 87 | 55 | 10 | 73 | 27 | Crosslinking | Yes |
| Example | 3 | 0.10 | 3428 | 91 | 15 | 1 | 76 | 24 | Crosslinking | Yes |
| Example | 4 | 0.12 | 3420 | 83 | 30 | 8 | 69 | 31 | Crosslinking | Yes |
| Example | 5 | 0.09 | 3412 | 90 | 11 | 2 | 75 | 25 | Non-crosslinking | Yes |
| Example | 6 | 0.11 | 3400 | 90 | 40 | 15 | 75 | 25 | Non-crosslinking | Yes |
| Example | 7 | 0.12 | 3452 | 94 | 13 | 4 | 52 | 48 | Crosslinking | Yes |
| Example | 8 | 0.15 | 3448 | 88 | 37 | 20 | 49 | 51 | Crosslinking | Yes |
| Example | 9 | 0.12 | 3420 | 89 | 20 | 16 | 49 | 51 | Crosslinking | Yes |
| Example | 10 | 0.15 | 3448 | 93 | 24 | 27 | 26 | 74 | Crosslinking | Yes |
| Example | 11 | 0.12 | 3420 | 90 | 14 | 21 | 25 | 75 | Crosslinking | Yes |
| Example | 12 | 0.15 | 3448 | 92 | 55 | 10 | 87 | 13 | Crosslinking | Yes |
| Example | 13 | 0.24 | 3452 | 39 | 30 | 3 | 74 | 26 | Crosslinking | Yes |
| Example | 14 | 0.30 | 3448 | 41 | 82 | 15 | 77 | 23 | Crosslinking | Yes |
| Example | 15 | 0.20 | 3428 | 48 | 44 | 4 | 72 | 28 | Crosslinking | Yes |
| Example | 16 | 0.24 | 3420 | 51 | 89 | 24 | 77 | 23 | Crosslinking | Yes |
| Example | 17 | 0.05 | 3428 | 94 | 8 | 1 | 78 | 22 | Crosslinking | No |
| Comparative Example | 1 | 0.14 | 3352 | 97 | — | — | — | — | Non-crosslinking | No |
| Comparative Example | 2 | 0.06 | 3452 | 95 | — | — | — | — | Non-crosslinking | No |
| Comparative Example | 3 | 0.07 | 3332 | 93 | — | — | — | — | Non-crosslinking | No |

TABLE 4

| | | Performances during manufacturing | | Fouling resistance test |
|---|---|---|---|---|
| | | Permeate flow rate m$^3$/m$^2$/day | Salt removal rate % | Permeate retention rate (—) |
| Example | 1 | 0.86 | 99.80 | 0.85 |
| Example | 2 | 0.81 | 99.82 | 0.88 |
| Example | 3 | 0.92 | 99.78 | 0.80 |
| Example | 4 | 0.86 | 99.80 | 0.82 |
| Example | 5 | 0.90 | 99.76 | 0.78 |
| Example | 6 | 0.86 | 99.79 | 0.80 |
| Example | 7 | 0.91 | 99.80 | 0.76 |
| Example | 8 | 0.85 | 99.82 | 0.79 |
| Example | 9 | 0.91 | 99.80 | 0.72 |
| Example | 10 | 0.91 | 99.82 | 0.68 |
| Example | 11 | 0.89 | 99.80 | 0.69 |
| Example | 12 | 0.78 | 99.82 | 0.87 |

TABLE 4-continued

| | | Performances during manufacturing | | Fouling resistance test |
| | | Permeate flow rate m³/m²/day | Salt removal rate % | Permeate retention rate (—) |
|---|---|---|---|---|
| Example | 13 | 0.76 | 99.71 | 0.85 |
| Example | 14 | 0.71 | 99.74 | 0.88 |
| Example | 15 | 0.67 | 99.73 | 0.79 |
| Example | 16 | 0.63 | 99.76 | 0.81 |
| Example | 17 | 0.94 | 99.78 | 0.70 |
| Comparative Example | 1 | 0.97 | 99.76 | 0.59 |
| Comparative Example | 2 | 0.76 | 99.76 | 0.55 |
| Comparative Example | 3 | 0.90 | 99.72 | 0.49 |

Although the present invention has been described in detail with reference to specific embodiments, it will be apparent to those skilled in the art that various changes and modifications can be made without departing from the spirit and scope of the present invention. This application is based on Japanese Patent Applications (Japanese Patent Application No. 2018-034860 and Japanese Patent Application No. 2018-034861) filed on Feb. 28, 2018, the contents of which are incorporated herein by reference.

REFERENCE SIGN LIST

1 Surface of membrane

The invention claimed is:

1. A composite semipermeable membrane comprising:
a microporous support layer;
a separation functional layer arranged on the microporous support layer; and
a coating layer configured to coat the separation functional layer, wherein the separation functional layer comprises a crosslinked aromatic polyamide which is a condensate of a polyfunctional aromatic amine and a polyfunctional aromatic acid chloride, and
the coating layer comprises an aliphatic polymer comprising a polyether moiety and a carboxylic acid polymer moiety,
wherein the coating layer has a fold structure comprising protruding portions and recessed portions, and 80% or more of a proportion of protruding portions have a height of 100 nm or more among the protruding portions of the fold structure.

2. The composite semipermeable membrane according to claim 1, wherein a weight fraction of the polyether moiety in the aliphatic polymer is 30% or more.

3. The composite semipermeable membrane according to claim 2, wherein a weight fraction of the carboxylic acid polymer moiety in the aliphatic polymer is 20% or more.

4. The composite semipermeable membrane according to claim 2, wherein the polyether moiety has one or more structures included in the following structure group (I):

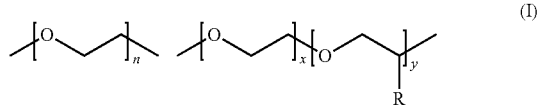

(I)

wherein (n is an integer of 1 or more and 100 or less, x and y each independently are an integer of 1 or more and 50 or less, and R represents a methyl) group.

5. The composite semipermeable membrane according to claim 2, wherein the aliphatic polymer has a crosslinked structure.

6. The composite semipermeable membrane according to claim 5, wherein the crosslinked structure comprises an amide bond.

7. The composite semipermeable membrane according to claim 1, which satisfies the following conditions (A), (B), (C), and (D):

(A) intensity of a maximum peak between 3700 cm$^{-1}$ and 2900 cm$^{-1}$ is 0.08 or more in a difference spectrum of an IR spectrum measured under conditions of 25° C. and a relative humidity of 97% and an IR spectrum measured under conditions of 25° C. and a relative humidity of 3%;

(B) a peak top wave number of the difference spectrum between 3700 cm$^{-1}$ and 2900 cm$^{-1}$ is 3400 cm$^{-1}$ or more and 3550 cm$^{-1}$ or less;

(C) a formula (1): $(a+b)/(c+d+e) \geq 10$ (1) is satisfied, in which a, b, c, d, e are respectively count numbers in the cases of m/z of positive secondary ions=45.03, 59.05, 104.03, 108.07, 135.06 when a coating layer side of the composite semipermeable membrane is measured by using time-of-flight secondary ion mass spectrometry; and (D) a formula (2): $f/(g+h+i) \geq 1$ (2) is satisfied, in which f, g, h, i are respectively count numbers in the cases of m/z of negative secondary ions=71.02, 103.02, 107.06, 133.04 when the coating layer side of the composite semipermeable membrane is measured by using time-of-flight secondary ion mass spectrometry.

8. The composite semipermeable membrane according to claim 1, wherein the coating layer aliphatic polymer and the separation functional layer crosslinked aromatic polyamide are bonded to each other by an amide bond.

9. A composite semipermeable membrane element comprising the composite semipermeable membrane according to claim 1.

* * * * *